United States Patent
Zhang (10) Patent No.: US 12,093,109 B2
(45) Date of Patent: Sep. 17, 2024

(54) METHOD AND SYSTEM FOR CONTROLLING PEAK POWER CONSUMPTION

(71) Applicants: VeriSilicon Microelectronics (Shanghai) Co., Ltd., Shanghai (CN); VeriSilicon Holdings Co., Ltd., Cayman Islands (GB); VeriSilicon Microelectronics (Nanjing) Co., Ltd., Nanjing (CN)

(72) Inventor: Huiming Zhang, Shanghai (CN)

(73) Assignees: VeriSilicon Microelectronics (Shanghai) Co., Ltd., Shanghai (CN); VeriSilicon Holdings Co., Ltd., Grand Cayman (KY); VeriSilicon Microelectronics (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 17/263,901

(22) PCT Filed: Dec. 2, 2019

(86) PCT No.: PCT/CN2019/122382
§ 371 (c)(1),
(2) Date: Jul. 8, 2022

(87) PCT Pub. No.: WO2020/238121
PCT Pub. Date: Dec. 3, 2020

(65) Prior Publication Data
US 2022/0342474 A1    Oct. 27, 2022

(30) Foreign Application Priority Data
May 29, 2019  (CN) .......................... 201910457063.2

(51) Int. Cl.
*G06F 1/324*  (2019.01)
*G06F 1/26*  (2006.01)
(Continued)

(52) U.S. Cl.
CPC ............ *G06F 1/324* (2013.01); *G06F 1/3206* (2013.01); *G06F 1/26* (2013.01); *G06F 1/3203* (2013.01); *G06F 9/505* (2013.01); *G06F 11/3409* (2013.01)

(58) Field of Classification Search
CPC .......... G06F 1/324; G06F 1/26; G06F 1/3203; G06F 1/3206; G06F 11/3409; G06F 9/505
(Continued)

(56) References Cited

U.S. PATENT DOCUMENTS 8,160,753 B2 *  4/2012  Ferentz ................. H04L 12/10
                                                                    713/340
8,410,768 B2     4/2013  Huber et al.
(Continued)

FOREIGN PATENT DOCUMENTS

| CN | 101365192 A | 2/2009 |
| CN | 102314208 A | 1/2012 |

(Continued)

OTHER PUBLICATIONS

Zhang Biying, Analysis of Steady-state Temperature and Performance for Multicore Processors considering Workload Variation, Chinese Doctoral Dissertations/Master's Theses Full-text Database, Information Science and Technology, Jan. 15, 2018, Entire document, Issue No. 1, China Academic Journals (CD Edition) Electronic Publishing House, CN.

*Primary Examiner* — Ji H Bae
(74) *Attorney, Agent, or Firm* — IPRTOP LLC (57) ABSTRACT

The present disclosure provides a method and system for controlling peak power consumption, which dynamically
(Continued)

controls frequency by monitoring the load in real-time, thereby reducing the power consumption, and providing sufficient computing performance while controlling peak power consumption. The method and system for controlling peak power consumption of the present disclosure monitor the load in real-time, and reduce power consumption by dynamically and intelligently controlling the operating frequency, to achieve a balance between performance and power consumption, such that the chip works at the highest frequency when the peak power consumption does not exceed the load threshold, thereby effectively improving the work efficiency while achieving the power consumption control.

11 Claims, 3 Drawing Sheets

(51) Int. Cl.
*G06F 1/3203* (2019.01)
*G06F 1/3206* (2019.01)
*G06F 9/50* (2006.01)
*G06F 11/34* (2006.01)

(58) Field of Classification Search
USPC .................................................. 713/300, 322
See application file for complete search history.

(56) References Cited

U.S. PATENT DOCUMENTS

| | | | |
|---|---|---|---|
| 2010/0299545 A1* | 11/2010 | Lyu | ........................ G06F 1/324 |
| | | | 713/320 |
| 2012/0011377 A1 | 1/2012 | Yu et al. | |
| 2013/0290754 A1 | 10/2013 | Zhang et al. | |
| 2014/0095696 A1* | 4/2014 | Sala | ..................... G06F 11/3409 |
| | | | 709/224 |
| 2014/0298057 A1 | 10/2014 | Zhu | |
| 2015/0261583 A1* | 9/2015 | Vanka | ..................... G06F 9/544 |
| | | | 719/313 |
| 2019/0065257 A1* | 2/2019 | Davila | .................. G06F 9/4881 |
| 2019/0073585 A1 | 3/2019 | Pu et al. | |
| 2020/0249962 A1* | 8/2020 | Vichare | ................. G06F 9/5083 |

FOREIGN PATENT DOCUMENTS

| | | |
|---|---|---|
| CN | 103176944 A | 6/2013 |
| CN | 103559092 A | 2/2014 |
| CN | 105511591 A | 4/2016 |
| CN | 107340500 A | 11/2017 |
| CN | 109117262 A | 1/2019 |
| JP | 2004355599 A | 12/2004 |
| JP | 2005196430 A | 7/2005 |
| JP | 2015130035 A | 7/2015 |
| JP | 2018005569 A | 1/2018 |
| KR | 1020110050010 A | 5/2011 |

* cited by examiner

METHOD AND SYSTEM FOR CONTROLLING PEAK POWER CONSUMPTION

BACKGROUND

Field of Disclosure

The present disclosure relates to power consumption control, in particular, to a method and system for controlling peak power consumption.

Description of Related Arts

With the vigorous development of Artificial Intelligence (AI) and Internet of Things (IoT) technologies, the requirements for AI computing power are increasing. With the increase in computing power, power control has become essential for AI chips. How to control power consumption within the power supply design threshold while providing powerful computing power has become one of the problems to be solved in chip design. It is also critical for chips to balance chip computing power and dynamic power consumption.

The traditional power consumption control method adopts frequency and voltage regulation algorithms. Static frequency and voltage regulation is one of the algorithms. The central processing unit changes the value of the control register of the voltage and frequency to achieve the purpose of controlling the frequency and voltage. In the AI chips, the load of the central processing unit is large, and it is mainly used to handle the process control and data synchronization of the convolutional network. There is a great delay in the control of voltage and frequency, and the control effect has a great hysteresis. In the case of a single-core processor, switching between tasks completed by an interrupt mechanism generally takes 1 to 2 milliseconds. Time delay will cause frequency and voltage control lag. If it is adjusted from high frequency to low frequency, adjusting the lag will cause excessive power consumption. If it is adjusted from low frequency to high frequency, the adjustment lag will result in performance degradation, and there will be a stuck phenomenon in the application, the balance of performance and power consumption cannot be achieved. Besides, controlling the frequency and voltage through the central processing unit will cause performance degradation for the main processing tasks of the central processing unit during frequent task switching. The central processing unit also consumes more power.

Another kind of frequency and voltage regulation algorithm is to use a specialized microprocessor to control the frequency and voltage. This method is one of the methods commonly used in AI chip systems. The specialized microprocessor only serves the process of power consumption and voltage control, and the response time to the control register can be increased by 5 to 10 times. However, this method requires additional microprocessor hardware resources, which is a huge waste of the chip area. Generally, the commonly used microprocessor has an area of 0.5 to 1 square millimeter under the 28 nm process. This requires a large chip area and the cost is high. The microprocessor is in a permanent working state, which consumes a lot of power.

Therefore, how to implement power consumption control without increasing area, cost, and power consumption has become one of the problems to be solved by those skilled in the art.

SUMMARY

The present disclosure provides a method and system for controlling peak power consumption, to achieve power consumption control without increasing the area, cost, and power consumption.

The present disclosure provides a method for controlling peak power consumption. The method least includes: monitoring a load of a to-be-controlled module in a current power consumption statistical period, wherein the to-be-controlled module enters a lowest peak power consumption state when loads of monitoring windows in the current power consumption statistical period are all greater than a load threshold, and controlling a working clock of the to-be-controlled module based on a frequency level corresponding to the lowest peak power consumption state; when the loads of the monitoring windows in the current power consumption statistical period are all less than the load threshold and are all greater than a lower load limit, if a current power consumption load is in a normal power consumption state, maintaining an original power consumption state, and remaining the frequency level unchanged; if a current peak power consumption state is lower than the normal power consumption state, the to-be-controlled module enters a peak power consumption state of an upper level, the frequency level rises by one level, controlling the working clock of the to-be-controlled module based on the frequency level corresponding to the peak power consumption state of the upper level, and increasing the load of the to-be-controlled module; when the loads of the monitoring windows in the current power consumption statistical period are not all less than the load threshold or are not all greater than the load threshold, maintaining the original power consumption state, remaining the frequency level unchanged, and remaining the load of the to-be-controlled module unchanged; monitoring the load of the to-be-controlled module in subsequent power consumption statistical periods, and adjusting a frequency of the working clock of the to-be-controlled module based on a load condition in the power consumption statistical periods, so that the to-be-controlled module works at the highest frequency when the peak power consumption of the to-be-controlled module does not exceed the load threshold.

Optionally, the to-be-controlled module includes a plurality of load units, and the load of the to-be-controlled module is a sum of a product of load weight and an actual load of each of the plurality of load units.

Optionally, the method for controlling peak power consumption comprises n power consumption states, and when the power consumption state rises by one level, the load of the to-be-controlled module increases 1/n times the load threshold, n is a positive integer.

Optionally, each power consumption statistical period comprises k monitoring windows, removing the first monitoring window and adding the k+1th monitoring window in the current power consumption statistical period to obtain the next power consumption statistical period, wherein k is a positive integer not less than 3.

Further optionally, the method for controlling peak power consumption further includes: when the loads of the monitoring windows in the current power consumption statistical period are all lower than the lower load limit, the frequency of the working clock decreases by a frequency band in the frequency level corresponding to the current power consumption state.

Further optionally, when the to-be-controlled module enters an idle state, the frequency of the working clock decreases to the lowest frequency.

Further optionally, the method for controlling peak power consumption is used for controlling the power consumption of an AI chip.

The present disclosure further provides a system for controlling peak power consumption based on the above method. The systems at least includes: a to-be-controlled module including a plurality of load units; a global control module coupled with the to-be-controlled module to provide a control signal and load weight information of the plurality of load units to the to-be-controlled module, and to obtain a load threshold based on a working state of the to-be-controlled module; a load information statistics module coupled with the global control module and the to-be-controlled module to monitor load information of the plurality of load units in the to-be-controlled module, and to calculate a load of the to-be-controlled module based on the load weight information of the plurality of load units in the global control module; a frequency and voltage regulation control module coupled with the load information statistics module to adjust a power consumption state of the to-be-controlled module based on the load of the to-be-controlled module; and a clock control module coupled between the frequency and voltage regulation control module and the to-be-controlled module to generate a clock signal of a corresponding frequency based on an output signal of the frequency and voltage regulation control module, and to control the to-be-controlled module to work based on the clock signal.

Optionally, the system for controlling peak power consumption is applied to an AI chip.

Further optionally, the to-be-controlled module includes a programmable arithmetic unit, a neural network accelerator, or a tensor processor.

Optionally, the frequency and voltage regulation control module includes a comparison unit and a plurality of power consumption state control units; the comparison unit compares the load of the to-be-controlled module with the load threshold in each power consumption statistical period; each of the plurality of power consumption state control units controls the to-be-controlled module to enter a corresponding power consumption state based on a comparison result output by the comparison unit.

Optionally, the clock control module includes a digital frequency division unit.

As described above, the method and system for controlling peak power consumption of the present disclosure have the following beneficial effects:

The method and system for controlling peak power consumption of the present disclosure monitor the load in real-time, and reduce power consumption by dynamically and intelligently controlling the operating frequency, to achieve a balance between performance and power consumption, such that the chip works at the highest frequency when the peak power consumption does not exceed the load threshold, thereby effectively improving the work efficiency while achieving the power consumption control.

DESCRIPTION OF REFERENCE NUMERALS

1 System for controlling peak power consumption
11 To-be-controlled module
12 Global control module
13 Load information statistics module
14 Frequency and voltage regulation control module
141 Comparison unit
142~144 First to third power consumption state control unit
15 Clock control module

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification.

The present disclosure can also be implemented or applied through other different exemplary embodiments. Various modifications or changes can also be made to all details in the specification based on different points of view and applications without departing from the spirit of the present disclosure.

Figure 1:
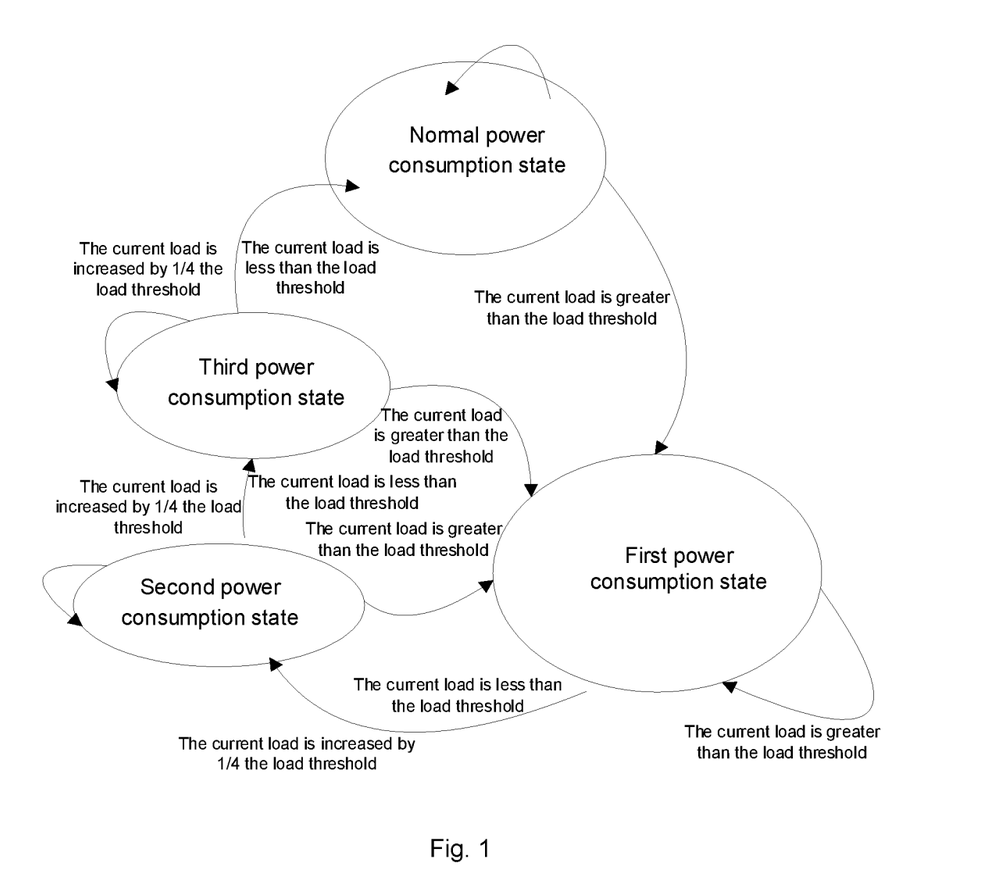
FIG. 1 shows a schematic flowchart of a method for controlling peak power consumption according to the present disclosure.
Figure 2:
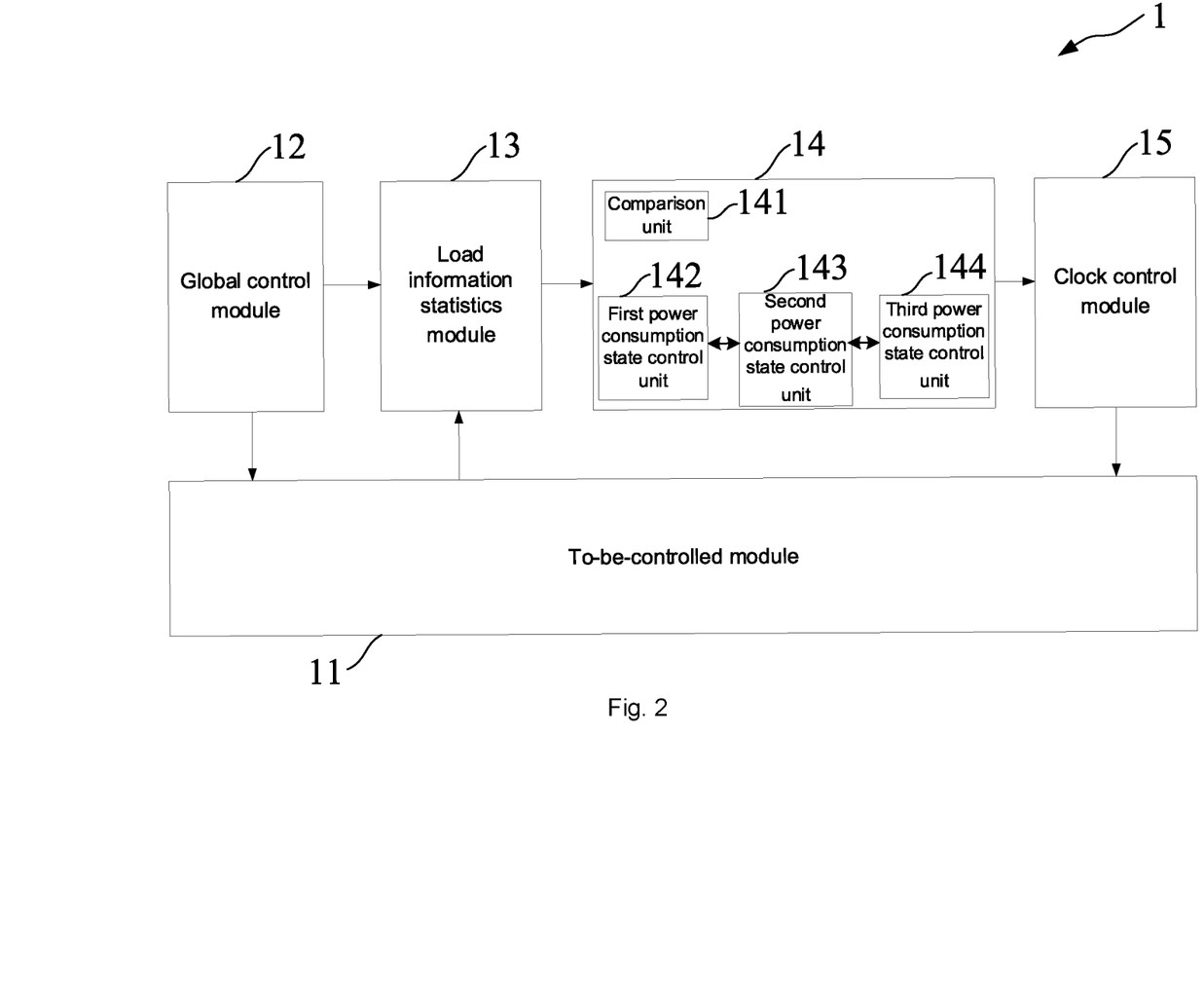
FIG. 2 shows a schematic view of a system for controlling peak power consumption according to the present disclosure.
Figure 3:
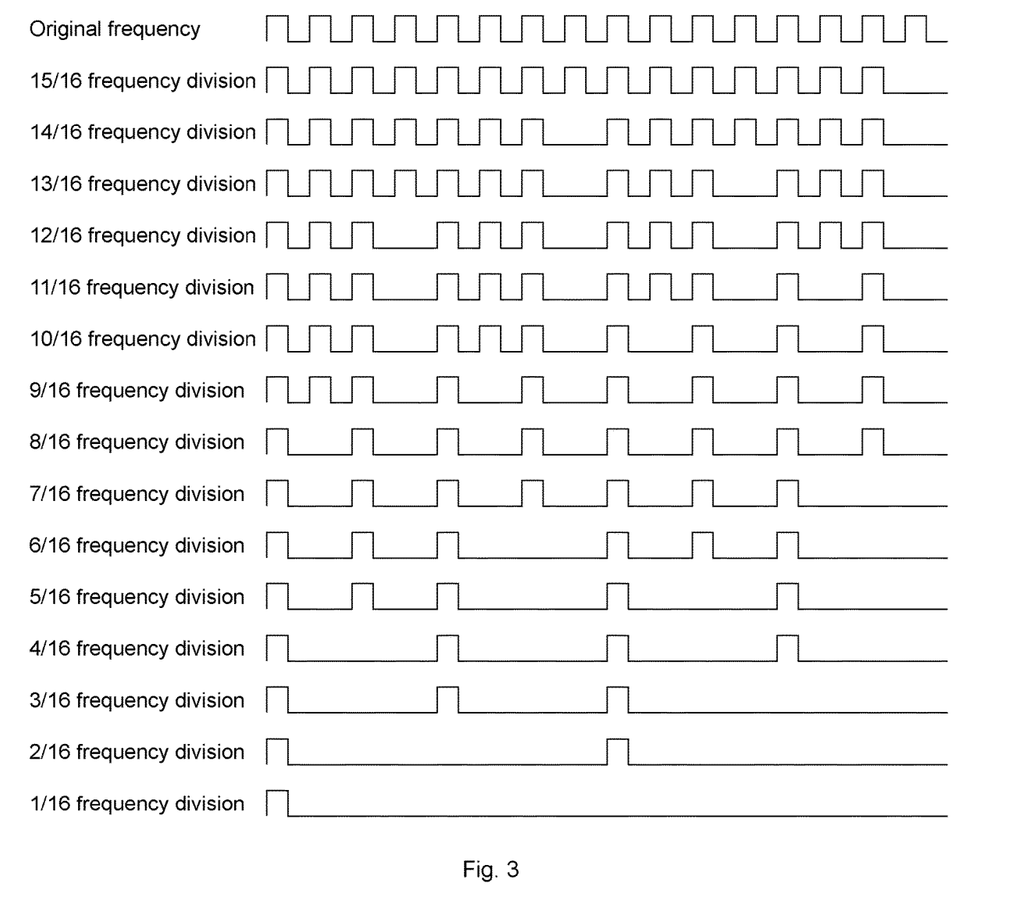
FIG. 3 shows a schematic view of a frequency division principle of a clock control module according to the present disclosure.

Referring to FIGS. 1-3. It needs to be stated that the drawings provided in the following embodiments are just used for schematically describing the basic concept of the present disclosure, thus only illustrating components only related to the present disclosure and are not drawn according to the numbers, shapes, and sizes of components during actual implementation, the configuration, number and scale of each component during the actual implementation thereof may be freely changed, and the component layout configuration thereof may be more complicated.

As shown in FIG. 1, the present disclosure provides a method for controlling peak power consumption. The method includes:

1) Monitoring a load of a to-be-controlled module in the current power consumption statistical period, and comparing the load in the current power consumption statistical period with the load threshold.

Specifically, in this embodiment, the to-be-controlled module is a computing unit of an AI chip. In actual use, any module that needs to control power consumption is applicable to the to-be-controlled module of the present disclosure, and is not limited to this embodiment.

Specifically, the load of the to-be-controlled module in a normal working state is obtained according to different application scenarios, and the load threshold is set. The working states of the to-be-controlled module in different application scenarios are different, and the load thresholds are also different, which can be set as needed.

Specifically, when the to-be-controlled module is a single load unit, the load of the to-be-controlled module is the actual load of the to-be-controlled module. When the to-be-controlled module includes a plurality of (2 or more) load units, the load of the to-be-controlled module is the sum of the product of the load weight and the actual load of each load unit.

Specifically, each power consumption statistical period includes k monitoring windows, the load of the to-be-controlled module 11 in each monitoring window is compared with the load threshold, and the power consumption statistical period is taken as a whole to get the comparison result. The monitoring windows of each power consumption statistical period adopt weight control. That is, the first monitoring window in the current power consumption statistical period is removed, and the k+1th monitoring window is added to obtain the monitoring windows of the next power consumption statistical period (the earliest monitoring window is removed and the newest monitoring window is added in time order). In this embodiment, k is set to 4 to improve the accuracy of monitoring (generally, 3 monitoring windows can improve the monitoring accuracy). In actual use, the number of monitoring windows in each power consumption statistical period can be set according to the need. On the premise of not requiring high accuracy or ensuring accuracy, the number of monitoring windows in each power consumption statistical period can be appropriately reduced, and is not limited to this embodiment.

2) When loads of monitoring windows in the current power consumption statistical period are all greater than the load threshold, the to-be-controlled module enters the lowest peak power consumption state, the frequency level is reduced to the lowest level, and a working clock of the to-be-controlled module is controlled based on a frequency level corresponding to the lowest peak power consumption state.

Specifically, the method for controlling peak power consumption includes n power consumption states. In this embodiment, n is set to 4, and the power consumption states are arranged as the first peak power consumption state, the second peak power consumption state, the third peak power consumption state, and the normal power consumption state according to the frequency from small to large. In this embodiment, the frequency levels corresponding to the first peak power consumption state, the second peak power consumption state, and the third peak power consumption state are frequency division signals of the frequency corresponding to the normal power consumption state.

Specifically, if the loads of the monitoring windows in the current power consumption statistical period are all greater than the load threshold, the to-be-controlled module is adjusted to the first peak power consumption state regardless of the current power consumption state, and the working clock of the to-be-controlled module is controlled based on the frequency level corresponding to the first peak power consumption state.

3) When the loads of the monitoring windows in the current power consumption statistical period are all less than the load threshold and are all greater than a lower load limit, if a current power consumption load is in a normal power consumption state, maintaining an original power consumption state, and remaining the frequency level unchanged. If the current power consumption load state is lower than the normal power consumption state, the to-be-controlled module enters a peak power consumption state of an upper level, the frequency level rises by one level, the working clock of the to-be-controlled module is controlled based on the frequency level corresponding to the peak power consumption state of the previous level, and the load of the to-be-controlled module is increased.

Specifically, if the loads of the monitoring windows in the current power consumption statistical period are all less than the load threshold and are all greater than the lower load limit, when the current power consumption load is in a normal power consumption state, the normal power consumption state is kept unchanged.

Specifically, if the loads of the monitoring windows in the current power consumption statistical period are all less than the load threshold and are all greater than the lower load limit, when the current power consumption load state is in the first peak power consumption state, the second peak power consumption state, or the third peak power consumption state, the to-be-controlled module is adjusted to the upper-level power consumption state, the corresponding frequency level increases by one level, and the load of the to-be-controlled module increases accordingly. That is, if the current power consumption state is in the first peak power consumption state, then rise to the second peak power consumption state. If the current power consumption state is in the second peak power consumption state, then rise to the third peak power consumption state. If the current power consumption state is in the third peak power consumption state, then rise to the normal power consumption state.

In some embodiments of the present disclosure, the power consumption state increases by one level, then the load of the to-be-controlled module increases by 1/n times the load threshold. In this embodiment, the load threshold is increased by ¼.

4) When the loads of the monitoring windows in the current power consumption statistical period are not all less than the load threshold or are not all greater than the load threshold, maintaining the original power consumption state, remaining the frequency level unchanged, and remaining the load of the to-be-controlled module unchanged.

5) Continuing to monitor the load of the to-be-controlled module in subsequent power consumption statistical periods, and adjusting a frequency of the working clock of the to-be-controlled module based on a load condition in the power consumption statistical periods, so that the to-be-controlled module works at the highest frequency when the peak power consumption of the to-be-controlled module does not exceed the load threshold.

6) As an implementation of the present disclosure, the method for controlling peak power consumption further includes: when the loads of the monitoring windows in the current power consumption statistical period are all lower than the lower load limit, the frequency of the working clock decreases by a frequency band in the frequency level corresponding to the current power consumption state.

Specifically, when the load of the to-be-controlled module is lower than the lower load limit, the load of the to-be-controlled module is low and does not need to work in a full frequency state. If the loads of the 4 monitoring windows in the current power consumption statistical period are all lower than the lower load limit, the frequency of the to-be-controlled module is reduced to the next frequency band. That is, the current frequency is assumed to be $12/16$ of the original frequency under normal working state, it will drop to $11/16$ of the original frequency under the normal working state. This embodiment supports a minimum of one-sixteenth frequency reduction. In actual use, the frequency of the lowest frequency reduction can be set as needed. If the load of the next power consumption statistical period is not lower than the lower load limit, the working frequency of the to-be-controlled module is raised by a frequency level in the current period to ensure that the to-be-controlled module has sufficient performance.

7) As an implementation of the present disclosure, if the to-be-controlled module enters an idle state, the clock frequency can automatically decrease to the lowest frequency.

More specifically, a specific example is given below:

S1: During the startup phase, the to-be-controlled module starts to work in a normal power consumption state; the power consumption state is updated according to the load within a power consumption statistical period.

S2: If the load of the to-be-controlled module is greater than the load threshold within a power consumption statistical period, the to-be-controlled module enters the first peak power consumption state, that is, the to-be-controlled module enters the first peak power consumption state from the normal power consumption state, and the frequency is reduced by three levels. The power consumption state is continuously updated according to the load in the next power consumption statistical period.

S3: If the load of the to-be-controlled module is greater than the load threshold in the next power consumption statistical period, the to-be-controlled module continues to maintain the first peak power consumption state. If the load of the to-be-controlled module is less than the load threshold and greater than the lower load limit, the to-be-controlled module enters the second peak power consumption state, the current load is increased by ¼ the load threshold, and the current frequency is increased by one level. The power consumption state is continuously updated according to the load in the next power consumption statistical period.

S4: If the load of the to-be-controlled module is greater than the load threshold in the next power consumption statistical period, the to-be-controlled module enters the first peak power consumption state from the second peak power consumption state. If the load of the to-be-controlled module is less than the load threshold and greater than the lower load limit, the to-be-controlled module enters the third peak power consumption state from the second peak power consumption state, the current load is increased by ¼ the load threshold, and the current frequency is increased by one level. The power consumption state is continuously updated according to the load in the next power consumption statistical period.

S5: If the load of the to-be-controlled module is greater than the load threshold in the next power consumption statistical period, the to-be-controlled module enters the first peak power consumption state from the third peak power consumption state. If the load of the to-be-controlled module is less than the load threshold and greater than the lower load limit, the to-be-controlled module enters the normal power consumption state from the third peak power consumption state, the current load is increased by ¼ the load threshold, and the current frequency is increased by one level. The load information statistics module will update the power consumption load state according to the load within a power consumption statistical period.

S6: cycle operation S2 to operation S5 to ensure that the to-be-controlled module works at the highest frequency when the peak power consumption does not exceed the load threshold.

The present disclosure reduces power consumption by dynamically controlling the voltage and frequency of the AI chip, while providing sufficient computing performance.

As shown in FIG. 2, the present disclosure provides a system 1 for controlling peak power consumption. The system 1 for controlling peak power consumption is used to implement the method for controlling peak power consumption. The system 1 includes a to-be-controlled module 11, a global control module 12, a load information statistics module 13, a frequency and voltage regulation control module 14, and a clock control module 15.

As shown in FIG. 2, the to-be-controlled module 11 includes a plurality of load units.

Specifically, in this embodiment, the to-be-controlled module 11 is set as a computing unit of an AI chip. Each load unit includes, but is not limited to, a programmable arithmetic unit, a neural network accelerator, and a tensor processor.

As shown in FIG. 2, the global control module 12 is coupled with the to-be-controlled module 11 and the load information statistics module 13, provides a control signal and load weight information of the plurality of load units to the to-be-controlled module 11, and obtains a load threshold based on the working state of the to-be-controlled module 11.

Specifically, in this embodiment, the global control module 12 obtains the load threshold, and the load weight information and mode control information of each load unit based on control information (each control information is used to determine the working state of the to-be-controlled module 11) provided by a central processing unit (not shown) and a driver (not shown), and sends the load weight information and mode control information of the load units to the to-be-controlled module 11. At the same time, the global control module 12 feeds back the load statistical information of the to-be-controlled module 11 to the driver, so that the driver can adjust the control strategy according to the internal situation of the AI chip.

As shown in FIG. 2, the load information statistics module 13 is coupled with the global control module 12 and the to-be-controlled module 11, monitors the load information of the load units in the to-be-controlled module 11, and calculates the load of the to-be-controlled module 11 based on the load weight information of the load units in the global control module 12.

Specifically, the load information statistics module 13 monitors the load information of each main pipelines (each load unit) of the to-be-controlled module 11, and statistically summarizes the load contributed by each load unit based on the load weight information of each load unit provided by the global control module 12. According to the importance of each load unit on the overall performance and the power consumption of the load unit itself, the load information of all load units is integrated according to the load weight of the upper-level load unit to obtain the load of the entire to-be-controlled module 11. In this embodiment, the main pipeline of the computing unit of the AI chip includes a programmable arithmetic unit, a neural network accelerator, and a tensor processor. The neural network accelerator is used to process convolution operations in the neural network. The tensor processor is used to process other mathematical operations in the neural network. The programmable arithmetic unit performs flow control and auxiliary calculation. From a performance perspective, the neural network accelerator is the most important. 80% of the operations are performed by the neural network accelerator, 15% of the operations are performed by the tensor processor, and 5% of the control and auxiliary calculations are performed by the programmable arithmetic unit. The load factor of the load information statistics module 13 for these three main modules is 80%, 15%, and 5%. Assuming that the power consumption of the neural network accelerator is load1, the power consumption of the tensor processor is load2, and the power consumption of the programmable arithmetic unit is load3, the load of the to-be-controlled module 11 is 80%×load1+15%×load2+5%×load3.

As shown in FIG. 2, the frequency and voltage regulation control module 14 is coupled with the load information statistics module 13, and adjusts a power consumption state of the to-be-controlled module 11 based on the load of the to-be-controlled module 11.

Specifically, as an implementation of the present disclosure, the frequency and voltage regulation control module 14 includes a comparison unit 141 and a plurality of power consumption state control units. In this embodiment, the frequency and voltage regulation control module 14 includes three power consumption state control units, which are respectively the first power consumption state control unit 142, the second power consumption state control unit 143, and the third power consumption state control unit 144. The comparison unit 141 compares the load of the to-be-controlled module 11 and the load threshold in each power consumption statistical period. In this embodiment, four monitoring windows are set in the power consumption statistical period. Each of the plurality of power consumption state control units controls the to-be-controlled module 11 to enter a corresponding power consumption state based on a comparison result output by the comparison unit 141. For the transition process and transition condition of each power consumption state, referring to the method for controlling peak power consumption, which will not be described here. The frequency and voltage regulation control module 14 can analyze the current minimum load condition to implement the frequency reduction operation, which will not be described here.

As shown in FIG. 2, the clock control module 15 is coupled between the frequency and voltage regulation control module 14 and the to-be-controlled module 11, generates a clock signal of a corresponding frequency based on an output signal of the frequency and voltage regulation control module 14, and controls the to-be-controlled module 11 to work based on the clock signal.

Specifically, as shown in FIG. 3, in this embodiment, the clock control module 15 includes a digital frequency division unit for dividing the original frequency by 16 in the normal working state, to obtain the frequency and down frequency corresponding to the frequency level. In this embodiment, the frequency levels corresponding to the first peak power consumption state control unit 142, the second peak power consumption state control unit 143 and the third peak power consumption state control unit 144 increase in sequence, which are respectively ¼, ½, and ¾ of the original frequency under the normal working state. In actual use, the frequencies corresponding to the frequency level control units can be set as required. In actual use, the clock control module 15 may adopt equal phase frequency division, which is not limited to this embodiment.

The method and system for controlling peak power consumption of the present disclosure improve the precise control of dynamic power consumption in AI chips, and can dynamically control the frequency of the chip to achieve the effect of reducing peak power consumption without affecting the performance of the chip. At the same time, it also solves the problem of CPU occupancy rate and large area overhead in the traditional power consumption control method.

The method and system for controlling peak power consumption of the present disclosure perform automatic frequency regulation through real-time monitoring of the load of each module of the AI chip. Frequency and voltage regulation can also be carried out through a combination of external software active control and internal hardware automatic control.

In summary, the present disclosure provides a method and system for controlling peak power consumption. The method includes: monitoring a load of a to-be-controlled module in a current power consumption statistical period, and controlling a working clock of the to-be-controlled module based on a frequency level corresponding to a lowest peak power consumption state, when loads of monitoring windows in the current power consumption statistical period are all greater than a load threshold, the to-be-controlled module enters the lowest peak power consumption state; when the loads of the monitoring windows in the current power consumption statistical period are all less than the load threshold and are all greater than a lower load limit, if a current power consumption load is in a normal power consumption state, maintaining an original power consumption state, and remaining the frequency level unchanged; if a current peak power consumption state is lower than the normal power consumption state, the to-be-controlled module enters a peak power consumption state of an upper level, the frequency level rises by one level, controlling the working clock of the to-be-controlled module based on the frequency level corresponding to the peak power consumption state of the previous level, and increasing the load of the to-be-controlled module; when the loads of the monitoring windows in the current power consumption statistical period are not all less than the load threshold or are not all greater than the load threshold, maintaining the original power consumption state, remaining the frequency level unchanged, and remaining the load of the to-be-controlled module unchanged; monitoring the load of the to-be-controlled module in subsequent power consumption statistical periods, and adjusting a frequency of the working clock of the to-be-controlled module based on a load condition in the power consumption statistical periods, so that the to-be-controlled module works at the highest frequency when the peak power consumption of the to-be-controlled module does not exceed the load threshold. The method and system for controlling peak power consumption of the present disclosure monitor the load in real-time, and reduce power consumption by dynamically and intelligently controlling the operating frequency, to achieve a balance between performance and power consumption, such that the chip works at the highest frequency when the peak power consumption does not exceed the load threshold, thereby effectively improving the work efficiency while achieving the power consumption control. Therefore, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

I claim:

1. A method for controlling peak power consumption, at least comprising:
   monitoring a load of a to-be-controlled module in a current power consumption statistical period, wherein the to-be-controlled module enters a lowest peak power consumption state when loads of monitoring windows in the current power consumption statistical period are all greater than a load threshold, and controlling a working clock of the to-be-controlled module based on a frequency level corresponding to the lowest peak power consumption state;

when the loads of the monitoring windows in the current power consumption statistical period are all less than the load threshold and are all greater than a lower load limit, if a current power consumption state of the to-be-controlled module is a normal power consumption state, maintaining the current power consumption state, and leaving a current frequency level unchanged; if the current power consumption state of the to-be-controlled module is lower than the normal power consumption state, raising the current power consumption state to a power consumption state that is one level higher than the current power consumption state, controlling the working clock of the to-be-controlled module based on a frequency level corresponding to the power consumption state that is one level higher than the current power consumption state, and increasing the load of the to-be-controlled module;

when the loads of the monitoring windows in the current power consumption statistical period are not all less than the load threshold or are not all greater than the load threshold, maintaining the current power consumption state, leaving the current frequency level unchanged, and leaving the load of the to-be-controlled module unchanged; and monitoring the load of the to-be-controlled module in subsequent power consumption statistical periods, and adjusting a frequency of the working clock of the to-be-controlled module based on a load condition in the subsequent power consumption statistical periods.

2. The method for controlling peak power consumption according to claim 1, wherein the to-be-controlled module comprises a plurality of load units, and the load of the to-be-controlled module is a sum of a product of a load weight and an actual load of each of the plurality of load units.

3. The method for controlling peak power consumption according to claim 1, wherein the method for controlling peak power consumption comprises n power consumption states, and when the current power consumption state rises by one level, the load of the to-be-controlled module increases 1/n times the load threshold, n is a positive integer.

4. The method for controlling peak power consumption according to claim 1, wherein each power consumption statistical period comprises k monitoring windows, removing a first monitoring window and adding a k+1th monitoring window in the current power consumption statistical period to obtain a next power consumption statistical period, wherein k is a positive integer not less than 3.

5. The method for controlling peak power consumption according to claim 1, further comprising: when the loads of the monitoring windows in the current power consumption statistical period are all lower than the lower load limit, the frequency of the working clock decreases by a frequency band in a frequency level corresponding to the current power consumption state.

6. The method for controlling peak power consumption according to claim 1, wherein when the to-be-controlled module enters an idle state, the frequency of the working clock decreases to a lowest frequency.

7. The method for controlling peak power consumption according to claim 1, wherein the method for controlling peak power consumption is used for controlling power consumption of an AI chip.

8. The method for controlling peak power consumption according to claim 7, wherein the to-be-controlled module is a computing unit of the AI chip.

9. The method for controlling peak power consumption according to claim 3, wherein n is 4.

10. The method for controlling peak power consumption according to claim 9, wherein the current power consumption state of the to-be-controlled module is one of four power consumption states, comprising the normal power consumption state, a third peak power consumption state, a second peak power consumption state, and a first peak power consumption state, with the first peak power consumption state being the lowest peak power consumption state.

11. The method for controlling peak power consumption according to claim 10, wherein the second peak power consumption state is one level higher than the first peak power consumption state, the third peak power consumption state is one level higher than the second peak power consumption state, and the normal peak power consumption state is one level higher than the third peak power consumption state.

* * * * *